(12) United States Patent
Schlanger

(10) Patent No.: US 6,938,962 B1
(45) Date of Patent: Sep. 6, 2005

(54) VEHICLE WHEEL SPOKE TERMINATION

(76) Inventor: Raphael Schlanger, 128 Hulda Hill Rd., Wilton, CT (US) 06897

( * ) Notice: Subject to any disclaimer, the term of this patent is extended or adjusted under 35 U.S.C. 154(b) by 0 days.

(21) Appl. No.: 10/390,442

(22) Filed: Mar. 17, 2003

Related U.S. Application Data

(60) Provisional application No. 60/365,349, filed on Mar. 18, 2002.

(51) Int. Cl.$^7$ ............................................. B60B 21/06
(52) U.S. Cl. ................................... 301/58; 301/95.106
(58) Field of Search ............................. 301/58, 95.101, 301/95.104, 95.106; 29/894.33, 894.333

(56) References Cited

U.S. PATENT DOCUMENTS

| | | | | |
|---|---|---|---|---|
| 291,457 A | * | 1/1884 | Woodard | 301/58 |
| 530,990 A | * | 12/1894 | Goodrich | 301/58 |
| 546,320 A | * | 9/1895 | Goodrich | 301/58 |
| 574,139 A | * | 12/1896 | Curry | 301/56 |
| 1,280,646 A | * | 10/1918 | Billhartz | 301/58 |
| 5,769,584 A | * | 6/1998 | Claes | 411/427 |
| 5,806,935 A | * | 9/1998 | Shermeister | 301/58 |
| 6,036,279 A | * | 3/2000 | Campagnolo | 301/55 |
| 6,428,115 B1 | * | 8/2002 | Chen | 301/95.106 |
| 6,443,533 B2 | | 9/2002 | Lacombe et al. | |
| 6,779,853 B1 | * | 8/2004 | Chang | 301/58 |
| 6,811,228 B2 | * | 11/2004 | Tien | 301/58 |

* cited by examiner

Primary Examiner—Russell D. Stormer

(57) ABSTRACT

A vehicle wheel spoke termination assembly includes an outer rim with means for holding a tire, a central hub assembly and a plurality of spoke portions. The central hub assembly includes an axle assembly and a hub shell that is rotatable about the axle. The spokes are connected at their outer ends to the outer rim hoop and at their inner ends to the hub flange. A connecting element is blindly attached to at least one of the outer rim and the hub flange for a firm connection between the connecting element and the spoke.

75 Claims, 11 Drawing Sheets

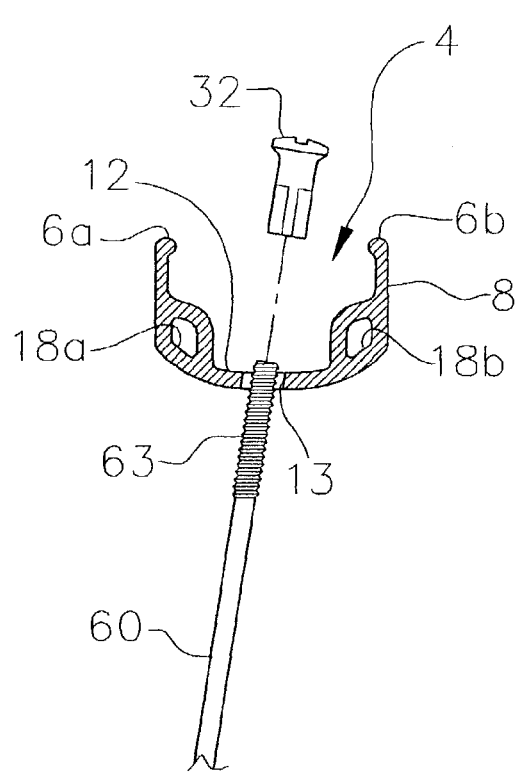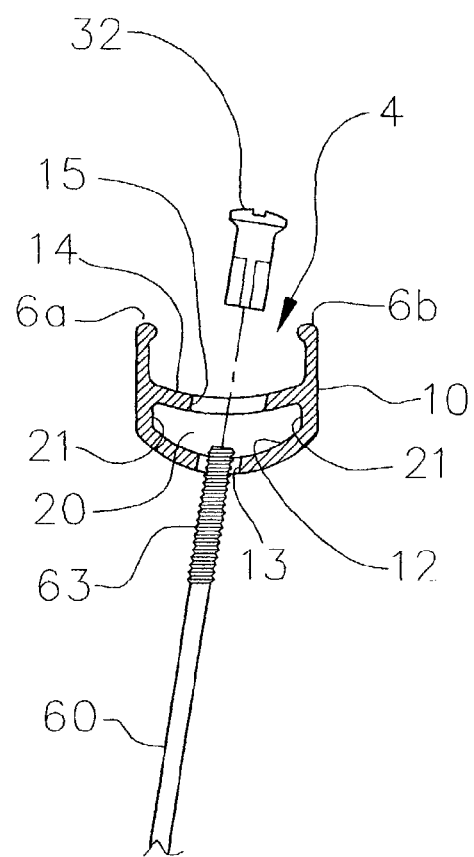
FIG. 1a
Prior Art
FIG. 1b
Prior Art

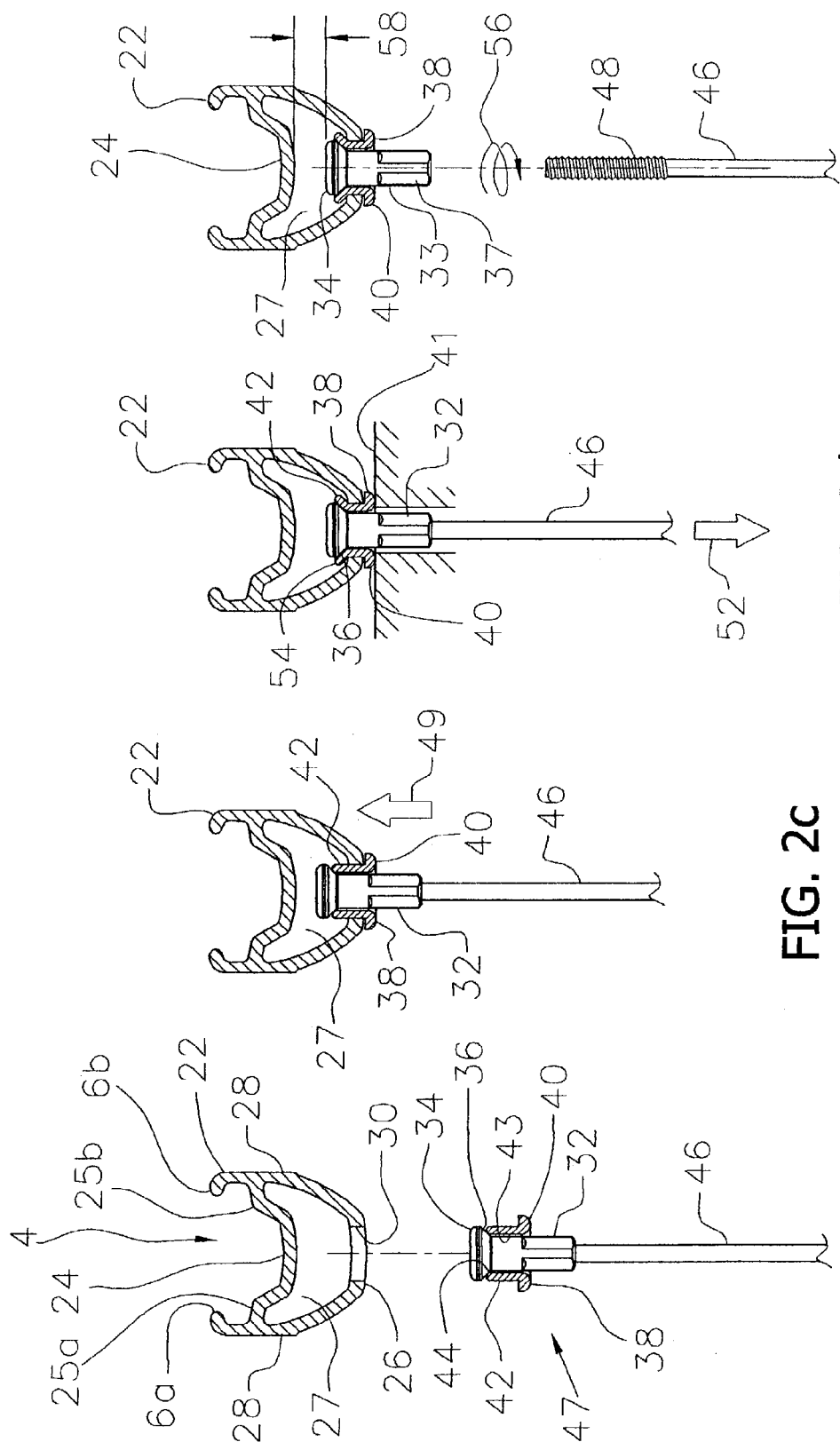

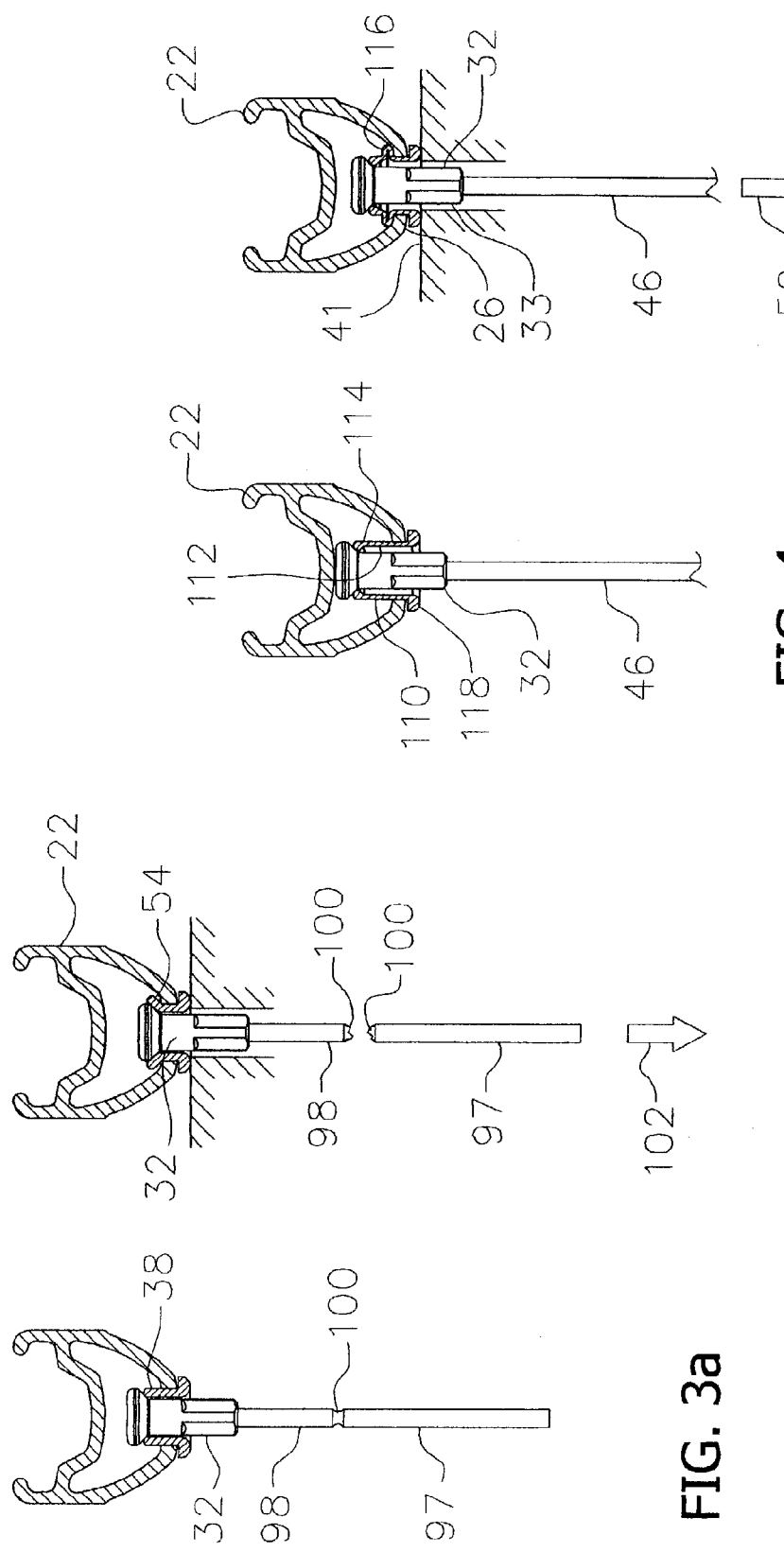

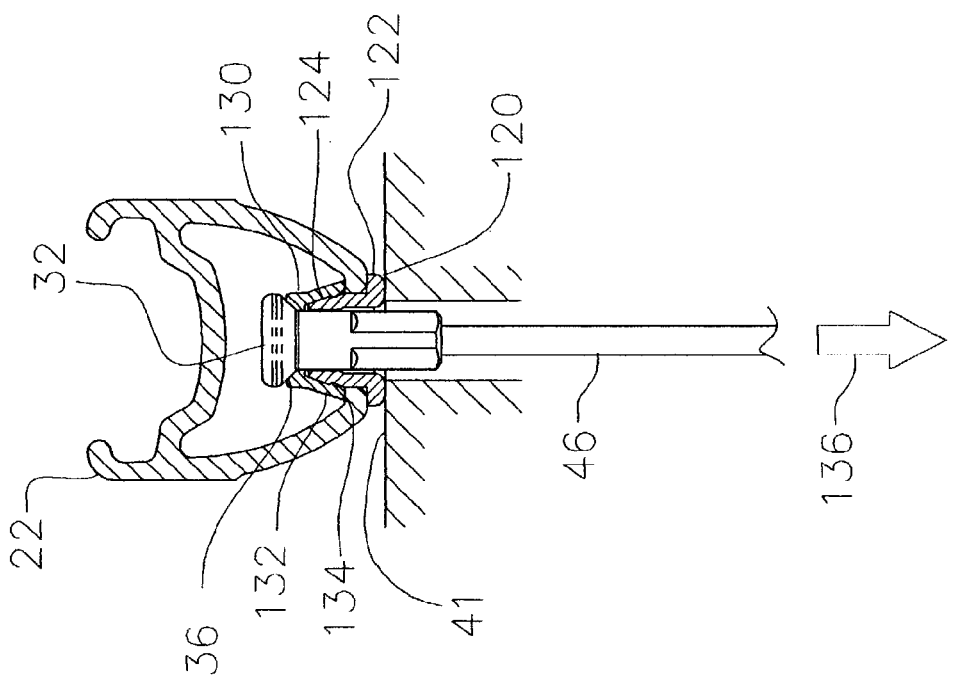
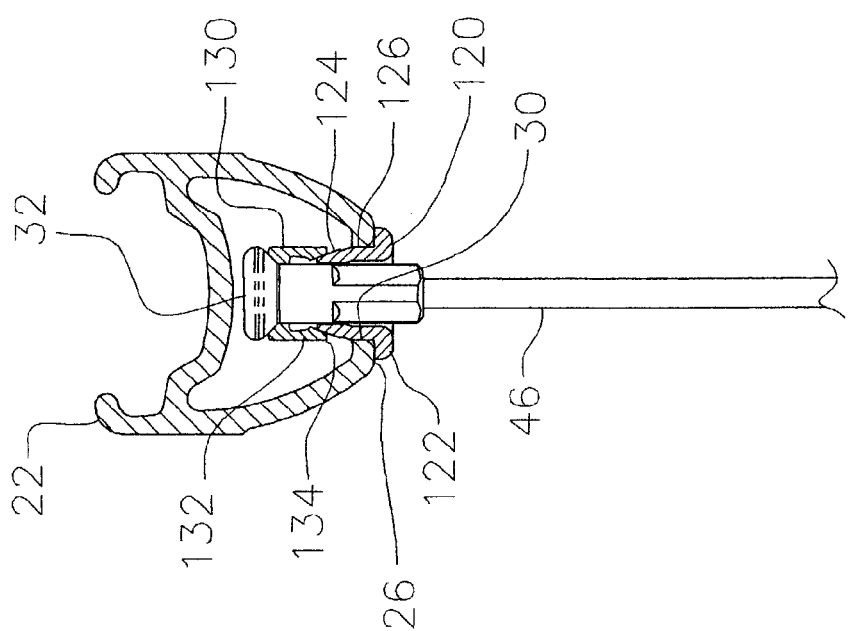
FIG. 7b
FIG. 7a

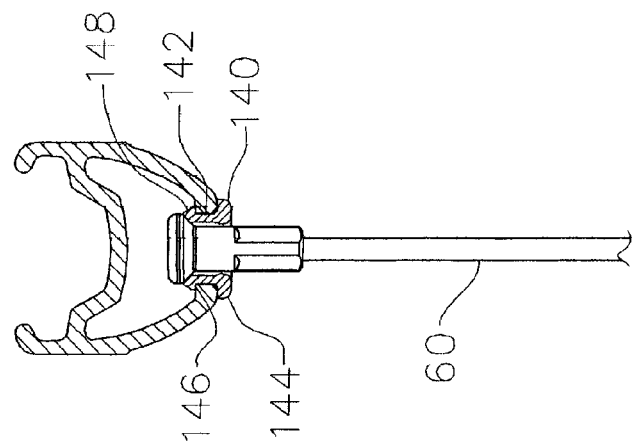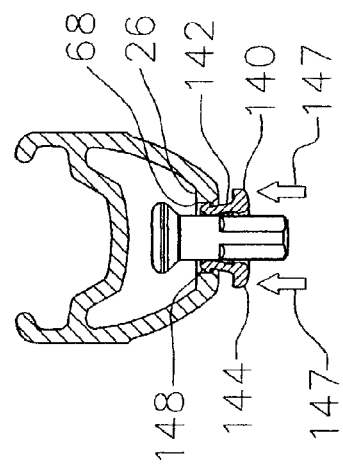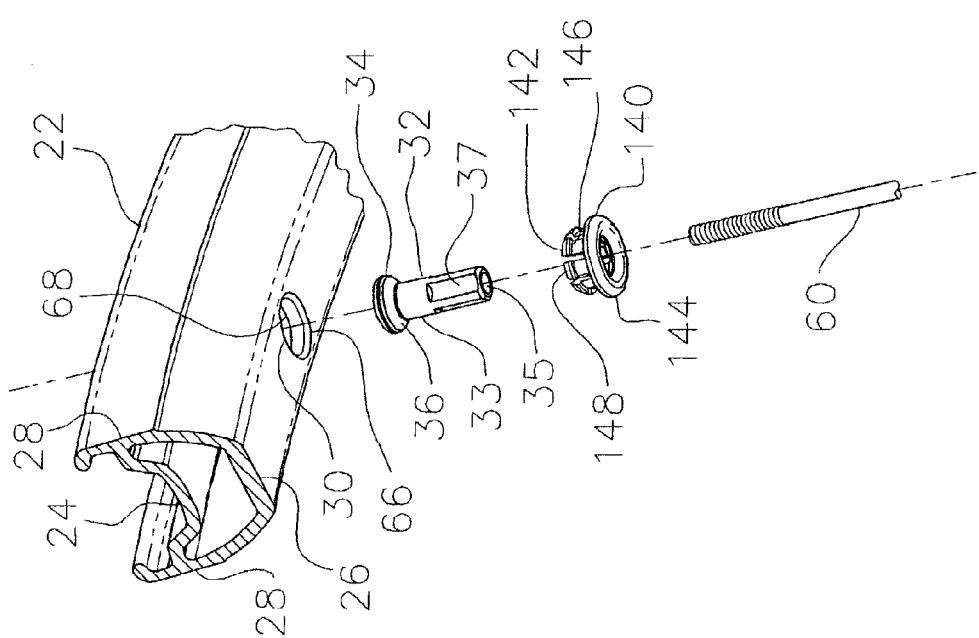

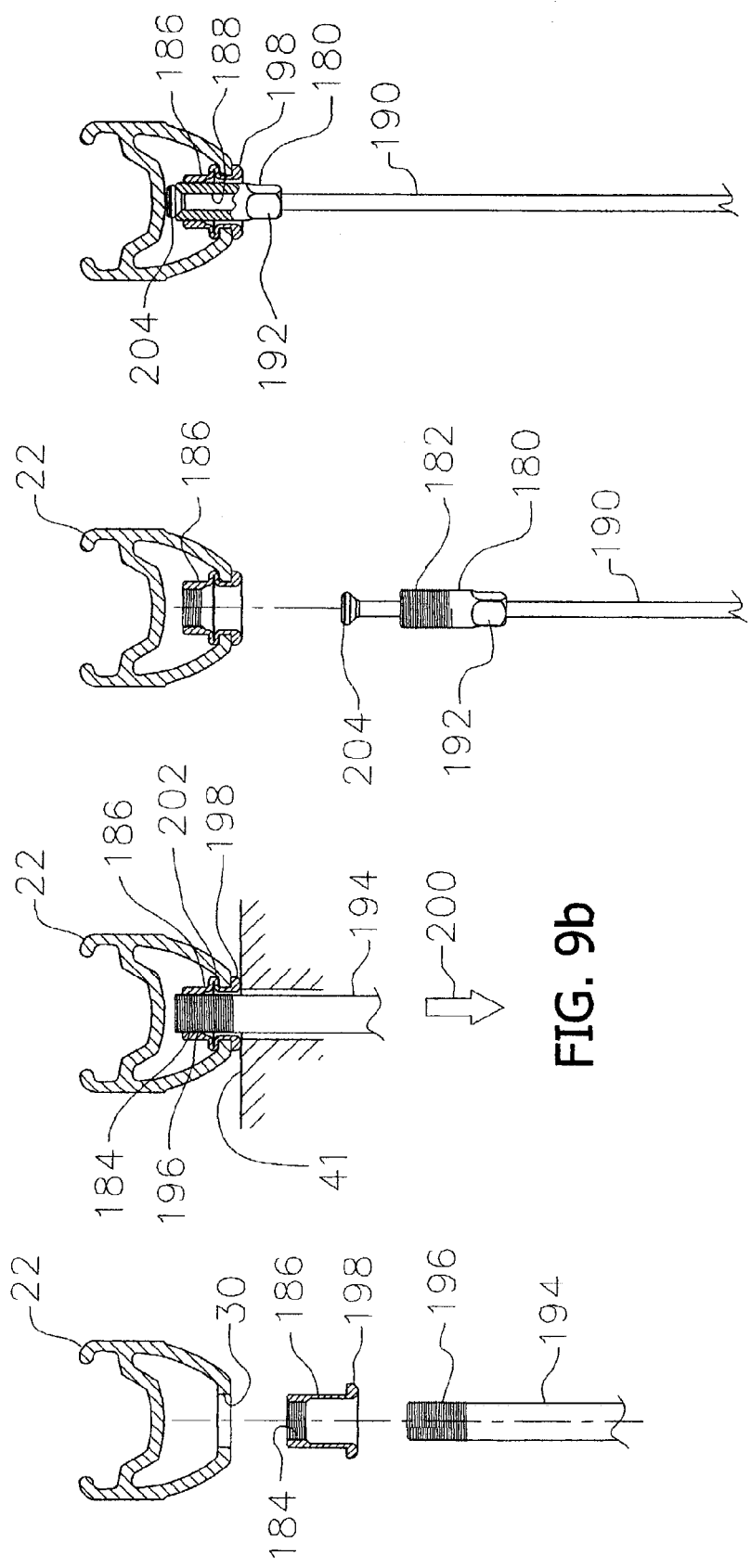

VEHICLE WHEEL SPOKE TERMINATION

CROSS-REFERENCE TO RELATED APPLICATION

This application claims priority of U.S. provisional patent application 60/365,349, filed Mar. 18, 2002, and entitled "Vehicle Wheel Spoke Termination".

BACKGROUND OF THE INVENTION (1) Field of the Invention

This invention is related to the means of attachment between the spoke and the rim of a vehicle wheel and between the spoke and hub of a vehicle wheel. This invention is particularly related to the connection of a spoke with a rim structure having a "double-wall" construction.

(2) Description of the Related Art

Bicycle wheel rims have historically been constructed to accept pneumatic tires that are designed to work in conjunction with an inner tube. This is the standard of the industry and is the arrangement that we are all familiar with. In this prior art configuration, the rim's tire bed includes a through-hole that is drilled through for passage of the spoke nipple. In a rim of "single-wall" construction, the spoke nipple bears directly against the rim's tire bed. In a rim of "double-wall" rim construction, the rim has two lateral walls, a tire bed and a spoke bed, with a cavity in between. The rim is drilled through both walls, piercing both the tire bed and the spoke bed, with the spoke bed recessed below the tire bed to accept the spoke nipples. Generally, the spoke is presented through the spoke bed from the inside diameter of the rim and the spoke nipple is presented for attachment to the spoke through the tire bed and from the outside diameter of the rim. With single-wall or double-wall rim constructions, a rim strip is utilized to protect the inner tube from the sharp edges associated with the holes and/or the spoke nipples. With rims of double-wall construction, the rim strip also serves to prevent the inner tube from extruding through the openings in the tire bed.

With the advent of tubeless tire technology, where the conventional inner tube is eliminated and the tires beads are sealed directly against the rim, it is desirable that the tire well be sealed and airtight to prevent air leakage from the tire cavity. This typically involves a rim of double-wall construction where the tire bed is sealed while the spoke bed is then adapted to accept the spokes. One method for sealing the tire bed is to eliminate the spoke holes in the tire bed. If the tire bed is not pierced for the spokes, then the only hole through the tire bed will be for the tire inflation valve, which may be constructed of rubber and is relatively easy to seal against the tire bed. An example of such a tubeless arrangement is outlined by Lacombe et al. in U.S. Pat. No. 6,443,533, where the tire bed remains unpierced and the spoke bed includes extruded spoke holes that are directly threaded with internal threads to accept special externally threaded spoke nipples.

SUMMARY OF THE INVENTION

The present invention utilizes an expandable connecting element or ferrule that is blindly inserted through a hole in the rim. The connecting element is deformed to engage the concealed edge and/or surface at the far end of the hole. The spoke or an element connected to the spoke is engaged to the connecting element to create a firm connection between the spoke and the spoke bed of the rim. Such connection might also be used at a hub.

One aspect of the invention involves a method for assembling a wheel. For each of a number of spoke holes in the wheel rim, a head either of an associated spoke or of a nipple associated with the associated spoke is inserted radially outward through the spoke hole. A ferrule is inserted radially outward through the spoke hole. The ferrule has a first surface for cooperating with an outboard surface of the spoke bed and a second surface for cooperating with the associated head.

In various implementations, the nipple and ferrule may be inserted as an assembly. The head may be biased against the ferrule to laterally expand the ferrule. The biasing may flare an outboard end portion of the ferrule. The biasing may bulge an intermediate portion of the ferrule. The biasing may cause one part of the ferrule to elastically expand another.

Another aspect of the invention involves a wheel. The wheel has a rim with a spoke bed having spoke holes and a tire bed radially outboard of the spoke bed and lacking holes aligned with the spoke holes. The rim includes a pair of lateral walls extending radially outward from opposite sides of the tire bed to cooperate with the tire bed to bound a tire well for receiving a tire. Spokes couple the rim to the hub with ferrules coupling the spokes to the rim. Each ferrule has a first portion extending within an associated spoke hole. A central hole of each ferrule accommodates either an associated spoke or an optional nipple coupled to the associated spoke. The ferrule has a second portion radially outboard of the spoke bed and cooperating with an outboard surface of the spoke bed to prevent radial inward movement of the associated spoke and permit tension in the spoke to be transferred to the rim. In various implementations, the ferrule may consist essentially of a single piece. Each ferrule may further have a third portion radially inboard of the spoke bed and larger than the associated spoke hole. The third portion may prevent the ferrule from passing further radially outward through the spoke hole. The nipples may each have a head cooperating with a radially outboard portion of the associated ferrule to prevent radial inward movement of the nipple relative to the ferrule. The nipples may each have a stem accommodated within the central hole of the ferrule and engaging the associated spoke such as by respective internal and external threads.

Another aspect of the invention involves a rim and spoke combination. The rim has a spoke bed with a number of spoke holes. A number of ferrules each have a first portion within an associated one of the spoke holes. There may be a number of nipples each having a head smaller than the associated spoke hole and cooperating with a radially outboard portion of the associated ferrule to prevent radial inward movement of the nipple relative to the ferrule such that in the absence of the ferrule the head would be able to pass through the spoke hole with clearance. Each nipple has a stem accommodated within a central hole of the associated ferrule and engaging an associated spoke. Alternatively, in the absence of such nipples each spoke may have such a head smaller than the associated spoke hole and so cooperating with the ferrule to prevent radial inward movement of the spoke relative to the ferrule.

Another aspect of the invention involves a wheel rim. The rim has a spoke bed with a number of essentially unthreaded spoke holes. A tire bed is radially outboard of the spoke bed and lacks holes aligned with the spoke holes. Lateral walls extend radially outward from opposite sides of the tire bed and cooperate with the tire bed to form a tire well. The spoke bed may lack bosses extending from the spoke holes. The rim may be substantially unitarily formed from a light alloy (e.g., aluminum alloy) or a fiber composite. A clincher tire may be mounted in the tire well advantageously in the absence of a separate tube. A valve may be sealingly mounted in a valve hole in the tire bed and extending through a valve hole in the spoke bed for inflating the tire.

BRIEF DESCRIPTION OF THE DRAWINGS

FIG. 1a is a partial radial cross-sectional view of a prior art single-wall rim;

FIG. 1b is a partial radial cross-sectional view of a prior art double-wall rim;

FIGS. 2b–e are partial radial cutaway views of the assembly of FIG. 2a in successive stages of assembly;

FIG. 2f is a partial radial cutaway view of a wheel including the assembly of FIG. 2a;

FIGS. 3a–b are partial radial cutaway views of the embodiment of FIGS. 2a–f in successive stages of assembly, in combination with a breakaway assembly pin;

FIGS. 4a–b are partial radial cutaway views of the rim and nipple assembly of an embodiment of the present invention in successive stages of assembly;

FIGS. 7a–b are partial radial cutaway views of the rim and nipple assembly of an embodiment of the present invention in successive stages of assembly;

FIG. 8a is a partial exploded perspective view of the rim and nipple assembly of an embodiment of the present invention, including a radial cutaway view of the rim and the parts associated with a single spoke connection prior to assembly;

FIGS. 8b–c are partial radial cutaway views of the rim and nipple assembly of FIG. 8a in successive stages of assembly;

FIGS. 9a–d are partial radial cutaway views of the rim and nipple assembly of an embodiment of the present invention in successive stages of assembly, in combination with an internally threaded ferrule;

DETAILED DESCRIPTION OF THE INVENTION

Figure 2A:
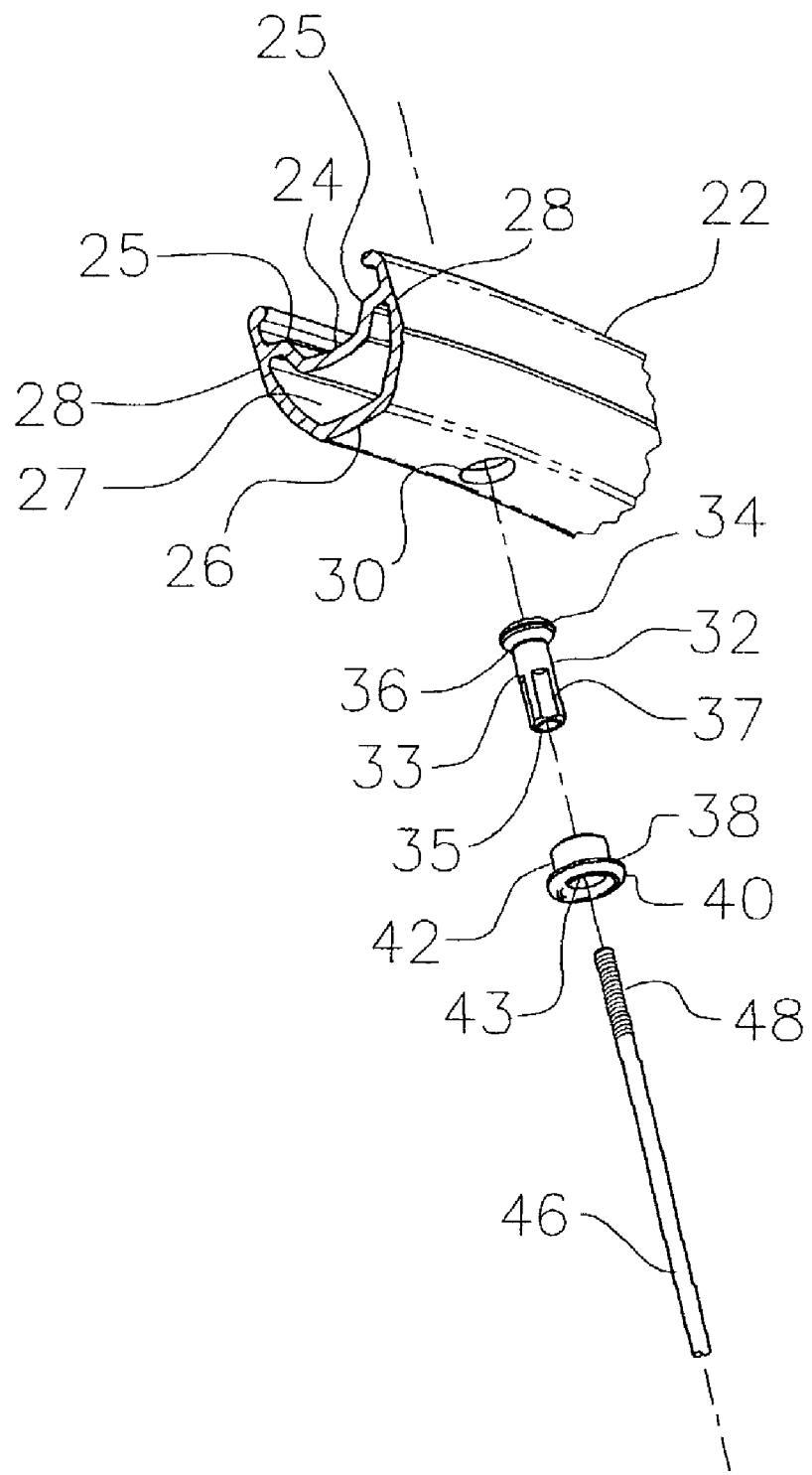
FIG. 2a is a partial exploded cutaway view of the rim and nipple assembly of an embodiment of the present invention in combination with an assembly pin.

FIG. 1a shows prior art single-wall rim 8 with a single lower web or spoke bed wall 11. Rim 8 includes two hooked flanges 6a and 6b for capturing the bead of a tire (not shown). Tire well 4 is a circumferential channel bounded by spoke bed 11 and flanges 6a and 6b. Spoke bed 11 also serves as a tire bed and includes opening 13 to accept a spoke 60 and spoke nipple 32. Spoke 60 includes threaded end 63 for threadable engagement with spoke nipple 32. Rim 8 may be produced as an aluminum extrusion that also includes cavities 18a and 18b to accept pins (not shown) that serve to join the butted ends of the extruded profile to create a continuous rim hoop. During assembly, the threaded end 63 of spoke 60 is first positioned to extend through the inside diameter end of opening 13. Next, the nipple 32 may be threadably assembled to the threaded end 63 of the spoke 60 through the outside diameter end of opening 13. With all of the spokes 60 of the wheel assembled to the rim in this way, a completed wheel assembly is achieved.

FIG. 1b shows a rim 10 of double-wall configuration with an upper web or tire bed 14 and a lower web or spoke bed 12. Rim 10 includes two hooked flanges 6a and 6b for capturing the bead of a tire (not shown). Tire well 4 is a circumferential channel bounded by tire bed 14 and flanges 6a and 6b. Spoke bed 12 includes opening 13 and tire bed 14 includes concentric opening 15, which serve to accept a spoke 60 and spoke nipple 32. Spoke 60 includes threaded end 63 for threadable engagement with spoke nipple 32. Rim 10 is produced as an aluminum extrusion that also includes an internal cavity 20 bounded by the spoke bed 12, the tire bed 14 and sides 21. It may be seen that, during assembly, the threaded end 63 of spoke 60 is first positioned to extend through the inside diameter end of opening 13. Next, the nipple 32 is threadably assembled to the threaded end 63 of the spoke first through opening 15 and then through opening 13. With all of the spokes 60 of the wheel assembled to the rim in this manner, a completed wheel assembly is achieved. It may be seen that, with the nipple 32 bearing against the spoke bed 12, opening 15 remains exposed as a passageway between the tire well 4 and the cavity 20.

Figure 2F:
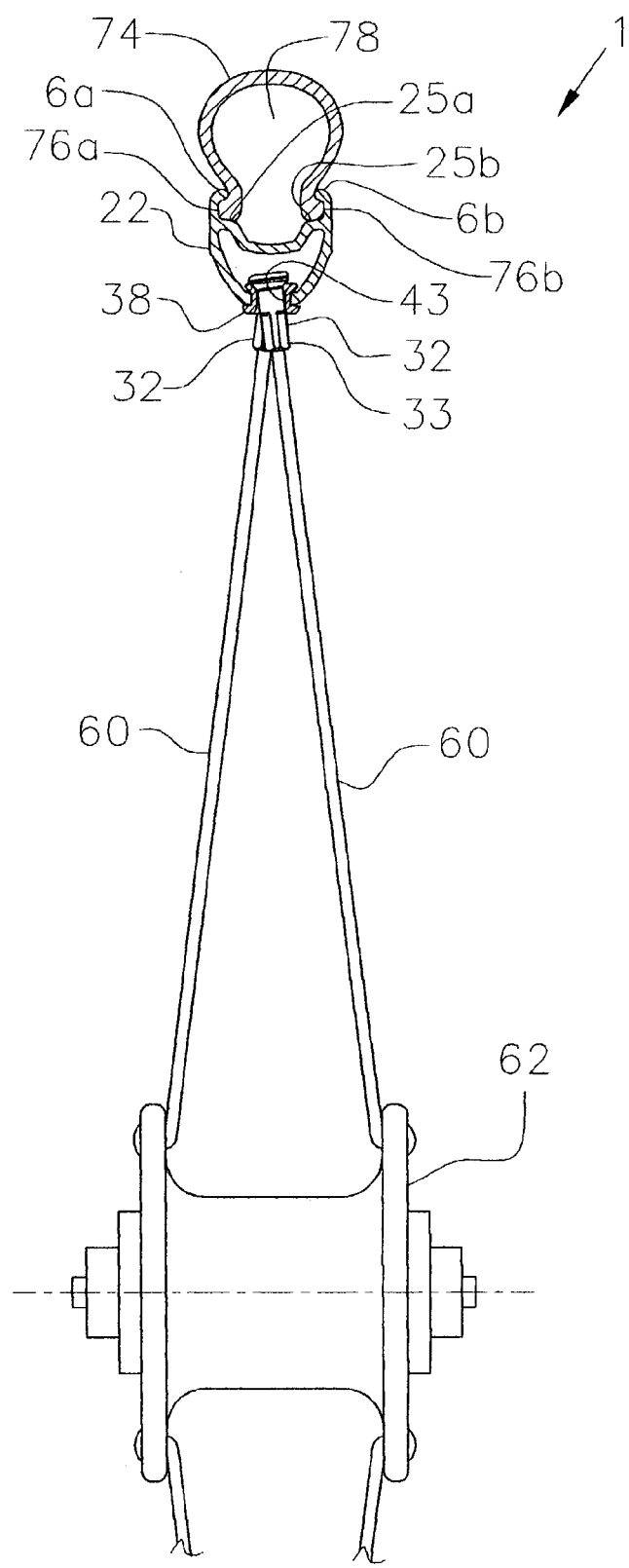

FIGS. 2a–f show stages in an exemplary assembly progression of a wheel 1. The components shown in FIG. 2a are in exploded view, prior to their assembly. Rim 22 is of "double-wall" construction and includes an enclosed cavity 27 bounded by the sidewalls 28, the upper web or tire bed 24 and the lower web or spoke bed 26. Tire well 4 is a circumferential channel bounded by tire bed 24 and flanges 6a and 6b. Rim 22 also includes ridges 25a and 25b in its tire bed 24 to facilitate bead-sealing and mounting of a tubeless tire (not shown). A hole 30 is drilled in the spoke bed 26 and is sized to accept the head 34 of nipple 32 and the collar 42 of ferrule 38. The exemplary hole is drilled substantially radially (e.g., its axis is radial or off radial to correspond to the axis of the main span of the spoke). Typically this will be much closer to radial than axial or circumferential (e.g., within 30 degrees of radial). The exemplary hole 30 remains unthreaded. The exemplary the spoke bed lacks unitarily-formed bosses extending from the radially inboard and/or outboard surfaces of the spoke bed surrounding the holes (e.g., from the outboard surface such as are utilized in U.S. Pat. No. 6,443,533). Nipple 32 may be of the conventional type and includes an enlarged head 34 and a stem 33, with a generally conically shaped transition surface 36 on the underside of the head 34. A threaded hole 35 extends through the center of the nipple 32 to accept the threaded portion of the spoke 60 when the complete wheel is assembled (as shown in FIG. 2f). The stem 33 also includes flats 37 to mate with a spoke nipple wrench (not shown) so that the nipple 32 may be manually turned in the conventional manner to adjust its threaded assembly with the spoke 60. The ferrule 38 includes a flange 40 and a cylindrical collar 42 with a central hole 43 that is sized to fit over the stem 33 of the nipple 32. The hole 43 of the collar 42 includes a chamfer 44 at its end and the outside diameter of the collar 42 is sized to roughly correspond with the outside diameter of the head 34 of nipple 32. The assembly pin 46 is very similar in configuration to the spoke 60 and includes external threads 48 that mate with threaded hole 35 of the nipple 32.

FIG. 2b shows the assembly pin 46, the ferrule 38, and the nipple 32 pre-assembled together prior to their assembly with the rim 22. Assembly pin 46 is threaded into the nipple 32 and the stem 33 is fitted within hole 43 such that chamfer 44 bears against the transition surface 36. This pre-assembly 47 is then fitted within hole 30 of the rim 22 in the direction 49 such that the underside of the flange 40 bears against the external surface of the spoke bed 26 and the collar 42 protrudes past the spoke bed 26 and into cavity 27 as shown in FIG. 2c. This flange 40 may be used to provide a depth-stop to prevent the ferrule from penetrating too deeply into its mating hole 30 in the rim 22.

Next, the external surface of the flange 40 is temporarily supported on a support tool 41 as shown in FIG. 2d and the ferrule 38 is then deformed by simultaneously pulling on the assembly pin 46 in the direction of arrow 52. Flange 40 may also serve to provide additional bearing surface for this temporary support tool 41.

This action forces the transition surface 36 to bear against the chamfer 44 of collar 42, causing the collar 42 to flare and deform to create the flared portion 54 as shown in FIG. 2d. This deforming action is similar to the assembly process associated with blind rivets that is well known in industry. In fact, a conventional blind rivet installation tool may be used to create the flared portion 54 by gripping and pulling the assembly pin 46 while simultaneously supporting flange 40 in the conventional manner.

The flared portion 54 now has an overlie engagement with the hole 30 that serves to retain the ferrule 38 within the hole 30 and thereby capture the nipple 32 within the rim 22. The assembly pin 46 is then unthreaded from the nipple 32 as indicated in the direction 56 in FIG. 2e. It is also desirable that the clearance 58 between the top of the head 34 and the underside of the tire bed 24 be sized to prevent the nipple 32 from inadvertently withdrawing from the ferrule 38 and falling elsewhere within the cavity 27 of the rim 22. Flats 37 of the stem 33 are now exposed and protruding past the flange 40 of the ferrule 38, allowing the nipple 32 to be accessed and twisted by a spoke nipple wrench (not shown) in the conventional manner. This entire process is repeated several times corresponding to the desired number of nipple locations in the rim 22. The rim 22, with its nipples 32 retained in place, may now be assembled with the spokes 60 and hub 62 as shown in FIG. 2f. The transition surface 36 of the nipple 32 bears against the flared portion 54 of the ferrule 38 to prevent the nipple 32 from pulling out of the rim 22 when tension is applied to the spokes 60. A blind connected assembly between the nipple 32 and the rim 22 is thus achieved.

While the assembly may be constructed such that the nipple 32 may be jammed and locked to the ferrule 38 by this deformation, it may be desirable that the nipple 32 be free to spin within the ferrule 38 so that it may be rotated in the conventional manner to threadably engage with a fixed spoke 60. The central hole 43 may be sized to provide additional clearance between the hole 43 and the stem 33. This clearance will allow the nipple 32 to swivel somewhat within the ferrule 38, permitting the nipple 32 to be more closely aligned with the spoke 60 span between the hub 62 and the rim 22 as shown in FIG. 2f.

FIG. 2f shows tire 74 mounted to rim 22. Tire 74 may be of tubeless construction with tire beads 76a and 76b sealed against their corresponding ridges 25a and 25b and flanges 6a and 6b. The sealed cavity 78 enclosed by the tire 74 and the tire well 4 may be filled with pressurized air to support the tire. Alternatively, the tire 74 may be utilized in conjunction with an inner tube or the tire may be of non-pneumatic construction.

With conventional bicycle rim technology, deformed eyelets are often employed with a similar function to the deformed ferrule of the present invention. However, these eyelets are not blindly installed and require that the tire bed 24 of the rim 22 be pierced for access to deform the eyelets and for assembly of the nipple. With the advent of tubeless tire technology, it is desirable that the tire bed 24 remains solid and non-perforated to provide proper air pressure sealing. Thus, it may be seen that the present invention provides particular advantage in tubeless tire configurations, since the sealed tire bed 24 is not required to be pierced and may now be used as a sealing air barrier.

An alternative arrangement could combine the nipple 32 and assembly pin 46 components, creating a nipple with an elongated stem that protrudes from the ferrule 38. In such a case, assembly pin 46 is unnecessary and the exposed portion of the elongated stem may instead be gripped and pulled directly by the installation tool to form the flared portion 54.

The assembly pin 46 may be utilized to provide a convenience to allow for a pre-assembled connection between the nipple 32 and the rim 22. As an alternative, the assembly pin 46 may be eliminated and the spoke 60 itself may instead be employed to serve the same function as an assembly pin.

The nipple 32 serves as a mandrel to deform the ferrule 38 as shown in the exemplary sequence of FIGS. 2a–f. As an alternative, the nipple 32 component and the assembly pin 46 component may be eliminated from this assembly in favor of a headed spoke (not shown). In that case, the headed spoke could include a transition surface directly formed under its head, with this transition surface functioning to deform the ferrule 38. The headed spoke would then extend from this connection to span to its connection with the hub.

FIGS. 3a and 3b show an alternate configuration of the assembly pin 46 of FIGS. 2a–e. Assembly pin 98 includes a necked region 100 to create a weakened site on the assembly pin 98 as shown in FIG. 3a. The cross-section of this necked region 100 is sized to calibrate its break-away load. During installation, the assembly pin 98 is gripped in the grip region 97 located beyond the necked region 100. When the ferrule 38 is deformed as shown in FIG. 2d and shown in FIG. 3b, the assembly pin 98 will break at the weakened necked region 100 at the predetermined tension load 102 corresponding to the load required for deformed expansion of the ferrule 38. FIG. 3b shows the ferrule 38 after deformation and the corresponding broken assembly pin 98 with the separated grip region 97. The cross sectional area and hardness of this necked region 100 may be closely controlled so that the assembly force, indicated by arrow 102 is very repeatable, resulting in a controlled level of deformed expansion of ferrule 38. Conventional blind rivets often utilize a similar necked region for controlled deformation of the rivet.

FIGS. 4a and 4b show an embodiment that utilizes a ferrule 110 that has a different crush zone than the ferrule 38 of FIGS. 2a–f. The ferrule 110 may be similar in most respects to the ferrule 38 of FIG. 2c. Ferrule 110 includes collar 114 and flange 118. Ferrule 110 also includes a thinned region 112 of collar 114. Thinned region 112 creates a weakened site for deformation of the collar 114 on installation. Flange 118 is then supported by support tool 41 as shown in FIG. 4b and the assembly pin 46 is utilized to draw nipple 32 in the direction 52 to deform the ferrule 10, with a method similar to that shown in FIG. 2d. This causes ferrule 110 to deform, creating a bulge 116 in the thinned region 112. The ferrule 110 is now deformed to capture the spoke bed 26 of rim 22. Nipple 32 may be of the conventional type as shown in FIGS. 2a–f and may be rotated independently of ferrule 110. With a portion of its stem 33 now protruding from flange 118, the nipple 32 may be manipulated for assembly with the spoke (not shown). In comparison with the embodiment of FIGS. 2a–f, where the end of ferrule 38 is flared, the ferrule 110 of FIGS. 4a–b employs a bulged crush zone at a location that is offset from its end. This type of deformed expansion is well known in industry and is utilized in the Rivnut® brand of blind rivet nuts.

Figure 5C:
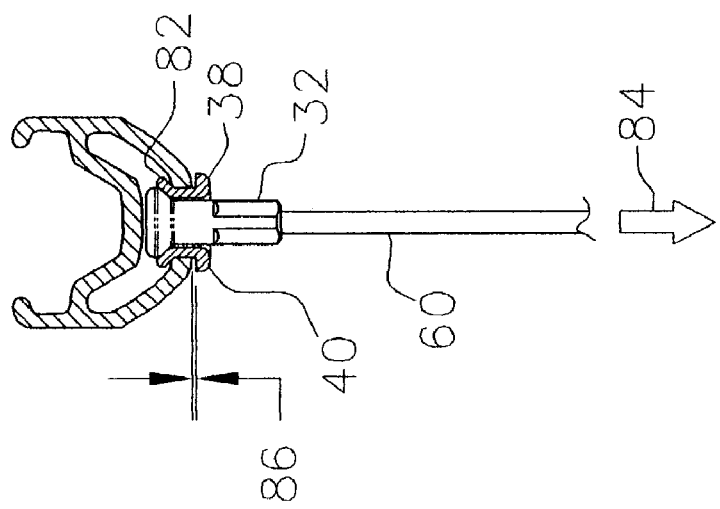
FIGS. 5a–c are partial radial cutaway views of the rim and nipple assembly of an embodiment of the present invention in successive stages of assembly.
Figure 5B:
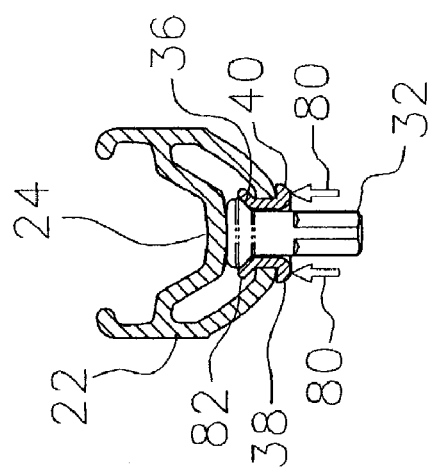
Figure 5A:
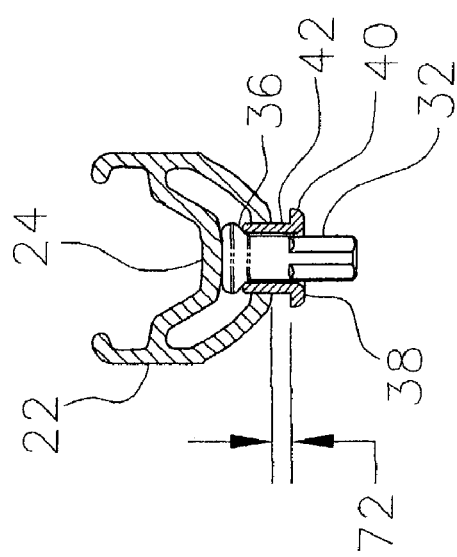

FIGS. 5a–c show an embodiment that utilizes a ferrule 38 and nipple 32 similar to that shown in FIGS. 2a–f. However, the installation process shown in FIGS. 5a–c is somewhat different. FIG. 5a corresponds roughly to FIG. 2c and shows the ferrule 38 and the nipple 32 located within hole 30 of rim 22. An assembly pin may not be required in this embodiment. The top of the head 34 of nipple 32 is positioned to bear against the interior surface of the tire bed 24. This limits the depth of installation of the ferrule 38 so that there is a gap 72 between the flange 40 and the spoke bed 26 of the rim 22. Installation and deformed expansion of the collar 42 of the ferrule 38 is achieved by using an arbor press or other tool to apply a load 80 to the outer surface of the flange 40. With the nipple 32 stopped against the tire bed 24 of the rim, installation load 80 bears against the flange 40 of the ferrule 38, forcing the collar 42 to press and flare against the transition surface 36 of the nipple 32, creating flared portion 82 as shown in FIG. 5b. Thus, instead of the nipple 32 being pressed against the collar 38 to create a flared portion 54, as previously shown in FIGS. 2a–f, the ferrule 38 of FIGS. 5a–c is shown here to be pressed against the nipple 32 to create the flared portion 82. The result is similar and the nipple 32 is now captured and retained with the rim 22 by the flared portion 82. With the assembly procedure of FIGS. 5a–c, it may be more difficult to flare the ferrule 38 so that the flared portion 82 is up against the internal surface of the spoke bed 26. Therefore, when the nipple 32 is assembled to the spoke 60, the spoke tension 84 will likely draw the ferrule 38 down slightly until the flared portion 82 contacts the internal surface of the spoke bed 26, creating a small clearance 86 between the underside of flange 40 and the external surface of the spoke bed 26.

The ferrule shown in these figures is preferably made from a relatively soft metal, such as aluminum or brass that will easily deform plastically at room temperature and also withstand the compressive loads associated with the spoke tension of a bicycle wheel. Polymeric materials may also be substituted as the ferrule material, however it may be desirable to locally heat the polymer ferrule to facilitate deformed expansion.

Figure 6A:
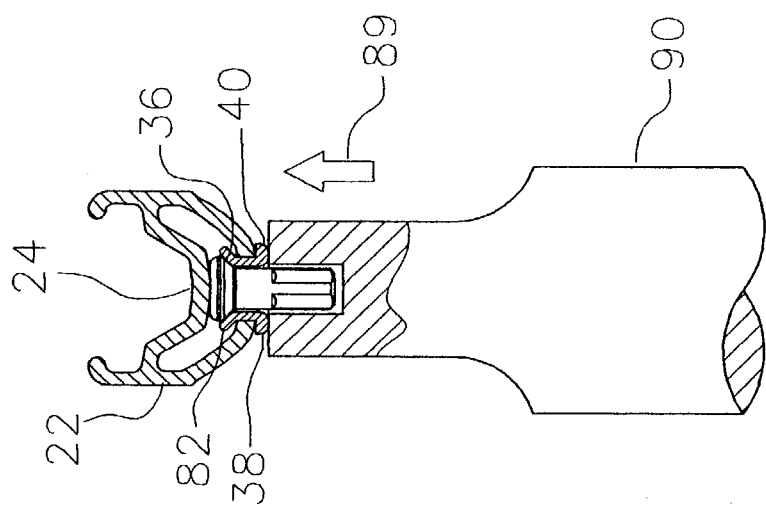
FIGS. 6a–b are partial radial cutaway views of the rim and nipple assembly of an embodiment of the present invention in successive stages of assembly in combination with an ultrasonic welding horn.
Figure 6B:
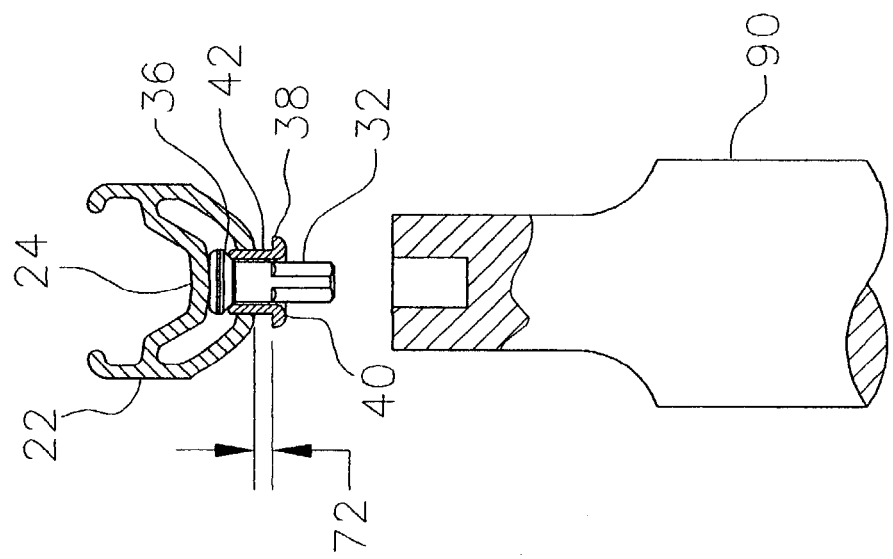

One method for creating such a localized plastic deformation in a thermoplastic polymer ferrule is to employ mechanical energy to create localized heating to facilitate such deformation. One such example is shown in FIGS. 6a and 6b, which show an embodiment that is similar to FIGS. 5a–b, however the ferrule 38 shown here may be of thermoplastic polymer material. The ferrule 38, nipple 32 and rim 22 are assembled as shown in FIG. 6a. An energized ultrasonic horn 90 is then pressed against the flange 40 in the direction 89, causing the end of the collar 42 to bear against the transition surface 36. The ultrasonic energy imparted by the horn heats the collar 42, causing it to soften and deform to create flared portion 82 as shown in FIG. 6b. The result is a deformed ferrule 38 that serves to capture and retain the nipple 32 within the rim 22. As an alternative to ultrasonic energy, the ferrule 38 may be spun relative to the nipple 32 to create frictional heat at the interface between the collar 42 and the transition surface 36 to facilitate the deformation to create flared portion 82. Such a method may be similar to spin-welding. While these methods are ideally suited to the heating and deformation of a ferrule 38 made of thermoplastic polymer, this type of procedure may also be applied to some metals to promote plastic deformation of the ferrule to provide similar effect.

FIGS. 7a and 7b show yet another arrangement where the nipple 32 may be retained in the rim 22. This embodiment employs a two-part ferrule, including a ferrule 120 component and an expander 130 component. Ferrule 120 includes flange 122 and collar 126 that includes a tapered conical surface 124. Expander 130 includes cylindrical sidewall 132 with radially inward-facing edge 134 at one end. Nipple 32, ferrule 120, expander 130, assembly pin 46 and rim 22 are loosely assembled through hole 30 as shown in FIG. 7a. Flange 122 is then supported by support tool 41 and assembly pin 46 is drawn in the direction 136, as shown in FIG. 7b. This forces the transition surface 36 of the nipple 32 to bear against the expander 130, causing the expander 130 to move relative to the ferrule 120 and thereby causing the sidewall 132 to be flared against the tapered surface 124 of collar 126. The expander 130 is drawn in the direction 136 to overlap the collar 126 until radially inward-facing edge 134 contacts the interior surface of the spoke bed 26 of the rim 22, as shown in FIG. 7b. The expander 130 thereby serves to retain the nipple 32 with the rim 22, permitting the nipple 32 to function in the conventional manner as previously shown. Thus, when the nipple 32 is subsequently assembled to the spoke, the spoke tension, which also acts in the direction 136, forces the expanded edge 134 to bear against the internal surface of the spoke bed 26, resisting pull-out of the nipple 32.

While the expander 130 may be retained with the ferrule 120 and become part of the rim and spoke connection assembly, the expander 130 may alternatively be a removable component that serves as a removable mandrel. In such an arrangement, the expander 130 may be first pressed against the ferrule 120 to expand the ferrule 120 and then removed prior to connecting the spoke to the nipple 32.

Exemplary embodiments may utilize plastic deformation of the ferrule to retain the nipple with the rim. Elastic deformation of the ferrule may additionally or alternatively be utilized. FIGS. 8a–c show ferrule 140, including spring fingers 142 and flange 144. The ferrule 140 may be formed of polymeric material. Spring fingers 142 each include overhang 146 and ramp 148. Ferrule 140 is first pre-assembled with nipple 32 (FIG. 8a) and then ferrule 140—nipple 32 pre-assembly is assembled to hole 30 of rim 22 (FIG. 8b). As ferrule 140 is assembled to hole 30 by pushing flange 144 in the direction 147, ramp 148 surfaces contact the near edge 66 of the hole 30, causing the spring fingers 142 to flex inward, allowing the spring fingers 142 to pass through hole 30 as shown in FIG. 8b. Near edge 66 of hole 30 may be chamfered to guide ramp 148 surfaces and facilitate assembly. On full installation of the ferrule 140, the overhang 146 is forced past the far edge 68 of hole 30 of the spoke bed 26, allowing the spring fingers 142 to elastically snap back into their relaxed position. Overhangs 146 of spring fingers 142 now create an overlie engagement with the spoke bed 26 of rim 22. The ferrule 140 is now retained within hole 30 by means of overhangs 146 as shown in FIG. 8c. The spoke 60 may now be assembled to nipple 32 as shown in FIG. 8c. As spoke tension is increased, the transition surface 36 of the nipple 32 may bear against spring fingers 142 and may wedge them outwardly against the sidewall of hole 30, thus reinforcing the overlie engagement between the overhangs 146 and the rim 22. Nipple 32 is now retained to the rim 22 by the ferrule 140 to resist spoke tension forces commonly associated with the fully assembled bicycle wheel.

In the conventional arrangement, the spoke nipple may include internal threads to mate with external threads of the spoke and rotational slippage between the nipple and the ferrule. The spoke nipple may be turned with a spoke nipple wrench, adjusting this threaded engagement to effectively shorten the spoke and thereby adjust the tension of the spoke.

Alternatively, the nipple may include external threads to engage with the ferrule and instead employ rotational slippage with respect to the spoke. Such an alternative arrangement is shown in FIGS. 9a–d where the nipple 180 includes external threads 182 to mate with the internal threads 184 of the ferrule 186.

FIG. 9a shows the installation parts prior to assembly, including rim 22, ferrule 186, and assembly pin 194. Rim 22 includes hole 30 for assembly with the ferrule 186. Ferrule 186 is of a configuration that is deformed in a manner similar to ferrule 110 of FIGS. 4a–b. Ferrule 186 includes internal threads 184 to mate with external threads 182 of nipple 180. Similar ferrules 186 are readily available in industry and are marketed under the Rivnut® brand. Assembly pin 194 includes external threads 196 that may be threadably assembled with the internal threads 184 of the ferrule 186. FIG. 9a shows the rim 22, the ferrule 186, and the assembly pin 194 prior to assembly. The ferrule 186 may be located within hole 30 and the assembly pin 194 may be threadably assembled to the ferrule 186. With the flange 198 supported in place by support tool 41, the assembly pin 194 is drawn in the direction 200. The ferrule 186 may then be deformed to create bulge deformation 202, similar to deformation 116 of FIG. 4b. Bulge deformation 202 serves to capture and retain ferrule 186 with rim 22. The assembly pin 194 is then unthreaded from the ferrule 186 and removed from the assembly. Ferrule 186 is now ready to accept nipple 180.

As shown in FIGS. 9c and 9d, nipple 180 includes a through hole 188 along its length that is sized to accept the spoke 190. Nipple 180 also includes external threads 182 and may include flats 192 for mating with a spoke nipple wrench (not shown). Spoke 190 includes an enlarged head 204. As shown in FIG. 9c, the spoke 190 is first preassembled to the nipple 180. The nipple 180 is then assembled to the ferrule 186 with its external threads 182 threadably engaged to the mating internal threads 184 of the ferrule 186 as shown in FIG. 9d. When spoke tension is applied to spoke 190, the underside of head 204 is drawn down against the nipple 180 and bears against the end of hole 188. The head 204 of the spoke 190 is thus anchored to the rim 22 through nipple 180 and ferrule 186. The threaded connection between the nipple 180 and the ferrule 186 may then be adjusted by engaging the spoke nipple wrench (not shown) with flats 192 to rotate the nipple 180 with respect to ferrule 186 to adjust the length of the threaded engagement and thereby adjust the tension of the spoke 190.

The assembly sequence shown in FIGS. 9a–d show a nipple 180 component that is separate from the spoke 190. The nipple 180 may be eliminated in favor of a threaded spoke (not shown) that is directly threaded at its end for threadable engagement directly with the internal threads 184 of the ferrule 186. In such a case, the threaded spoke may be rotated about its axis to thread into the ferrule 186. Alternatively, the ferrule 186 may be rotated independently of the rim 22 to thread over the threaded spoke.

Figure 10:
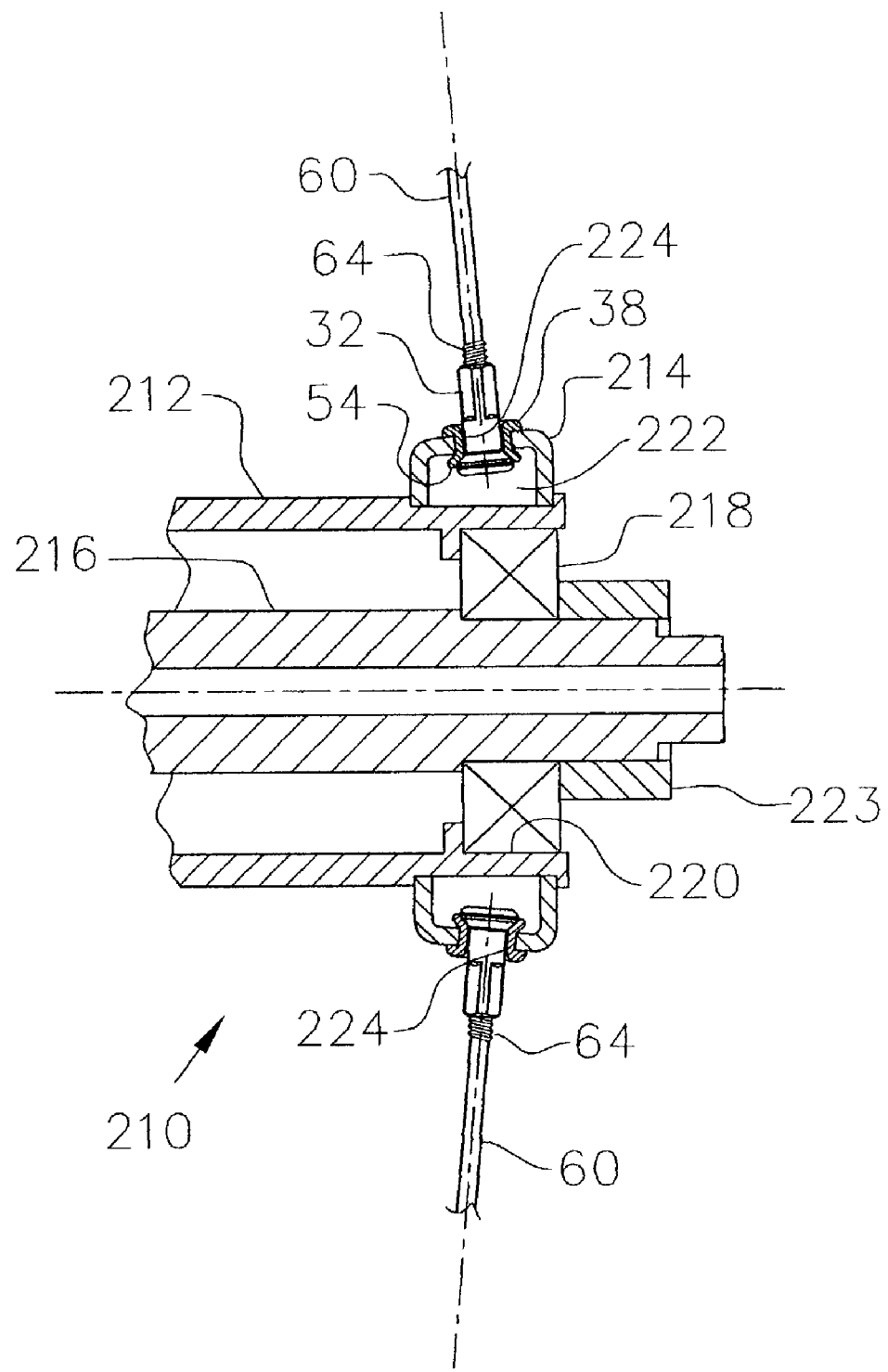
FIG. 10 is a partial radial cutaway view of the hub and nipple connection of an embodiment of the present invention, in combination with spoke attachment at the hub.

FIG. 10 is an exemplary embodiment that shows how a deformed ferrule may be utilized to create a connection between the inboard end of the spoke and the hub of the wheel. Hub assembly 210 includes a hub shell 212 with an enclosed hub flange 214 that is rotatable about the axle 216 via the bearing 218. Hub flange 214 creates a hollow annulus surrounding the hub shell 212, including cavity 222. Radial holes 224 are drilled through the outer periphery wall of the hub flange 214 to provide assembly sites for ferrule 38 which, in this example, is be identical to the ferrule 38 of FIGS. 2a–f. The outside diameter of bearing 218 is pressed into bearing bore 220 of hub shell 212 and the axle 216 is assembled through the inside diameter of the bearing 218. Locknut 223 is assembled to axle 216 to capture the inner race of bearing 218. Radial hole 224 corresponds roughly to hole 30 of FIG. 2a to provide openings for blind assembly of ferrule 38 and nipple 32 as shown in detail in FIGS. 2a–f. It may be seen that ferrule 38 is deformed in the manner shown FIGS. 2a–e to create a flared portion 54 and to create an overlie engagement with the hub flange 214 and to capture nipple 32 within hub flange 214. Threaded end 64 of spoke 60 may be threadably assembled to nipple 32 to firmly anchor the spoke to the hub flange 214. The spoke 60 extends from its connection at the hub flange 214 to its connection at the rim (not shown).

While my above description contains many specificities, these should not be construed as limitations on the scope of the invention, but rather as exemplifications of embodiments thereof. It is to be understood that the invention is not limited to the illustrations described and shown herein, which are deemed to be merely illustrative of the best modes of carrying out the invention, and which are susceptible of modification of form, size, arrangement of parts and details of operation. For example:

While these figures show how an expanded or otherwise deformed ferrule may be utilized to facilitate a spoke connection with the rim, such a connection may easily be achieved between the spoke and the hub shell portion of the hub.

While these figures show a blind assembly through a pre-existing hole in the rim, such a hole may be pierced during the assembly process. For example, the assembly pin of FIGS. 9a–b may include a pointed tip that extends through the ferrule. Spinning the assembly pin and forcing the pointed tip against the spoke bed of the rim may generate sufficient frictional heat to allow the pointed end to pierce the spoke bed.

While it is shown in these figures that the nipple is generally aligned with the vertical centerline of the rim, the rim and/or hole geometry may be arranged such that the ferrule may be installed offset or at an angle to this vertical centerline. This offset or angle of the ferrule would permit the nipple to be aligned to extend in the direction of the spoke span between its anchor points at the rim and the hub flange. Alternatively, there may be sufficient clearance between the stem of the nipple and the central hole of the ferrule to allow the nipple to swivel within the ferrule, permitting the nipple to be aligned to extend in the direction of the spoke span.

While most of these embodiments show the ferrule to be formed as a separate component from the nipple, these two components may alternatively be formed as a single contiguous part. This configuration would eliminate the intermediate spoke nipple component. Thus the spoke may be directly connected to the ferrule, by means of some method of engagement, such as a threaded engagement.

The spoke nipple may be regarded as an intermediate component in the connection between the spoke and the ferrule. In other words, the spoke connects to the nipple, the nipple connects to the ferrule, and the ferrule connects to the rim. There may be additional intermediate components inserted in this chain of connection.

These figures show the ferrule component to include a flange located externally to the hole to which the ferrule is assembled. Such a flange may be useful in creating an external overlie engagement with the rim to prevent the ferrule from withdrawing into the cavity of the rim. However, it should be recognized that the primary engagement of the present invention is the engagement to resist spoke tension, which is in the opposite direction to the overlie engagement of the flange. Therefore, the flange may provide a desirable convenience to aid in the assembly and/or retention of the ferrule and may not be a requirement for proper function of some or all of the embodiments described herein. The present invention may still be functional without an external flange in the ferrule.

The ferrule component may remain stationary with respect to the rim, while the nipple may be rotated about the axis of the spoke. The ferrule component may be permitted to rotate independently of the rim. If desired, this would allow the ferrule to rotate with the nipple and slip at its interface with the rim.

While the nipple is shown here to include female threads to mate with the male threads of the spoke, this is merely the conventional arrangement and the nipple may alternatively include male threads to mate with female threads of the spoke, or with female threads of an intermediate component that is connected to the spoke. A further alternative arrangement could dictate that the spoke and the nipple be contiguous, or otherwise rotatably locked together, with the threaded connection (if any) located at the opposite end of the spoke.

These embodiments show a blind connection with a blind hole through which the ferrule is connected. However the present invention may prove to be advantageous to achieve such a blind connection even in arrangements where the hole itself is not a blind hole and there is access to the opposite end of that hole.

Accordingly, the scope of the invention should be determined not by the embodiments illustrated, but is instead intended to encompass all such modifications that are within its spirit and scope as defined by the claims.

What is claimed is:

1. A wheel comprising:
    a central hub;
    an outer rim including a spoke bed with at least one spoke hole therein; an
    outer wall connected to the spoke bed and located radially outboard of said spoke bed, and an internal cavity between said spoke bed and said outer wall adjacent said spoke hole;
    a plurality of spokes extending between the outer rim and central hub, wherein at least one spoke includes an enlarged portion which is one of (1) integral with said spoke, and (2) a separate element connected to said spoke, and a stem portion of reduced cross-section in comparison with the enlarged portion;
    a ferrule connected to at least one of said spokes and at least one of said outer rim and said central hub, said ferrule including a collar portion with an external surface which extends through the spoke hole, a central opening through the collar portion having an internal surface to accommodate a portion of the spoke;
    wherein, the stem portion extends through the central opening in the ferrule, the collar portion of the ferrule extends within the spoke hole, the spoke hole extends through the spoke bed and includes a radially inboard first end facing the central hub with an associated first edge and a radially outboard second end opposed to the first end with an associated second edge, the collar portion of the ferrule includes an outwardly extending portion that extends beyond the second end of the spoke hole, the outwardly extending portion of the ferrule includes an overlie engagement with the spoke hole to resist spoke tension forces, the enlarged portion of the spoke includes a transition portion between the enlarged portion and the stem portion, and the spoke hole is at least partially obscured by the outer wall in the radially outboard direction.

2. A wheel according to claim 1, wherein the spoke hole is obscured by the outer wall in the radially outboard direction.

3. A wheel according to claim 1, wherein the outer wall is a tire bed.

4. A wheel according to claim 1, wherein the enlarged portion of the spoke is in said separate element.

5. A wheel according to claim 1, wherein said wheel is a tension spoke wheel including pre-tensioned spokes.

6. A wheel according to claim 1, wherein said outwardly extending portion is expanded to create an expanded portion, and wherein said expanded portion engages said rim in said overlie engagement in the region of the second end of said spoke hole.

7. A wheel according to claim 1, wherein at least a portion of
    the second edge of the spoke hole is a generally orthogonal edge, and wherein said overlie engagement includes engagement with at least one of said second edge and a surface adjacent said second edge.

8. A wheel according to claim 6, wherein said ferrule is deformably expanded to create said expanded portion.

9. A wheel according to claim 8, wherein the expanded portion is in the collar portion of the ferrule.

10. A wheel according to claim 9, wherein the expanded portion is a flared end of the collar.

11. A wheel according to claim 9, wherein said expanded portion is a bulged portion of the collar.

12. A wheel according to claim 11, wherein said collar has two end portions, and wherein said expanded portion is a bulged portion of the collar between said two end portions.

13. A wheel according to claim 8, wherein the transition portion serves as a mandrel to create said expanded portion.

14. A wheel according to claim 8, wherein the expanded portion is created by means of plastic deformation.

15. A wheel according to claim 14, including an external energy source operative to induce heat in said ferrule, wherein said heat serves to facilitate said plastic deformation.

16. A wheel according to claim 8, wherein the expanded portion is created by means of elastic deformation.

17. A wheel according to claim 8, wherein the expanded portion is created by means of a combination of plastic deformation and elastic deformation.

18. A wheel according to claim 8, wherein the expanded portion is created by means of a blind expansion.

19. A wheel according to claim 18, wherein said expanded portion of the ferrule is expanded by means positioned radially inboard of said spoke hole.

20. A wheel according to claim 8, wherein said ferrule is a multi-part ferrule, and wherein the expanded portion is in at least one of the parts of the multi-part ferrule.

21. A wheel according to claim 20, wherein said multi-part ferrule includes a ferrule element and an expanding element, and wherein said ferrule element is operative to expand said expanding element.

22. A wheel according to claim 8, wherein at least a portion of the collar portion of the ferrule is longitudinally split to facilitate expansion of the expanded portion of the ferrule.

23. A wheel according to claim 22, wherein said ferrule includes at least one spring finger, with said spring finger including an overhanging edge that engages at least one of said first and second edges to create said overlie engagement.

24. A wheel according to claim 23, wherein the expansion occurs in said spring finger.

25. A wheel according to claim 24, wherein the spring finger includes a collapsed position and an expanded position, and wherein the spring finger is engaged to the rim in the expanded position.

26. A wheel according to claim 25, wherein the enlarged portion of the spoke is pressed against the spring finger to maintain the spring finger in the expanded position.

27. A wheel according to claim 1, wherein the stem portion of the spoke has an external dimension that is smaller than the central opening of the collar portion of the ferrule.

28. A wheel according to claim 1, wherein the enlarged portion of the spoke is larger than the corresponding dimension of the internal surface of the collar portion of the ferrule.

29. A wheel according to claim 1, wherein the enlarged portion of the spoke has a diameter generally equal to the outside diameter of the collar portion of the ferrule.

30. A wheel according to claim 1, wherein the enlarged portion of the spoke is integral with the spoke.

31. A wheel according to claim 1, including a threaded engagement operative to connect the spoke to the ferrule.

32. A wheel according to claim 31, wherein the threaded engagement is a threadably adjustable connection operative to adjust the effective length of the spoke.

33. A wheel according to claim 31, wherein the threaded engagement is adjacent the ferrule.

34. A wheel according to claim 31, wherein said ferrule includes internal threads operative to threadably engage external threads that are at least one of (1) integral with said spoke, and (2) in a separate element connected to said spoke.

35. A wheel according to claim 1, wherein the ferrule includes a threaded portion for connection with the spoke.

36. A wheel according to claim 1, including a surface at least one of (1) integral with said spoke, and (2) in a separate element connected to said spoke, wherein said surface is operative to bear against said ferrule to maintain said overlie engagement.

37. A wheel according to claim 1, wherein the spoke includes a generally straight spoke span portion extending between the rim and central hub, and wherein the central opening of the ferrule is generally collinear with the spoke span of its corresponding spoke.

38. A wheel according to claim 1, wherein the spoke includes a generally straight spoke span portion extending between the rim and central hub, including a clearance between the inside diameter of the collar and the stem portion of the spoke, wherein the stem portion is generally aligned with the spoke span of its corresponding spoke.

39. A wheel according to claim 1, wherein said spoke is directly connected to said ferrule.

40. A wheel according to claim 1, wherein the ferrule is rotatable with respect to the spoke hole.

41. A wheel according to claim 1, wherein said ferrule includes an enlarged flange portion adjacent to said first end of said spoke hole.

42. A wheel according to claim 1, wherein said ferrule is a multi-part ferrule including a first part and a second part, wherein the first part is displaced relative to the second part to create said overlie engagement.

43. A wheel according to claim 1, wherein said ferrule includes an overhanging edge and wherein said overhanging edge results in said overlie engagement.

44. A wheel according to claim 1, wherein at least a portion of the second edge of the spoke hole is a sharp edge having an angle of at least 90 degrees between the corresponding sidewall of the spoke hole opening and the surface adjacent the second end.

45. A wheel according to claim 1, wherein said overlie engagement includes engagement with the surface adjacent the second edge of the spoke hole.

46. A wheel according to claim 1, wherein the enlarged portion is at one end of the spoke.

47. A wheel comprising:
a central hub;
an outer rim including a spoke bed with at least one spoke hole therein, an outer wall connected to the spoke bed and located radially outboard of said spoke bed, and an internal cavity between said spoke bed and said outer wall adjacent said spoke hole;
a plurality of spokes extending between the outer rim and central hub, wherein at least one spoke includes an enlarged portion and a stem portion of reduced cross-section in comparison with the enlarged portion, wherein said enlarged portion is located in a separate element connected to said spoke;
a ferrule connected to said separate element and at least one of said outer rim and central hub, said ferrule including a collar portion with an external surface which extends through the spoke hole, a central opening through the collar portion having an internal surface to accommodate a portion of the spoke, and an outwardly extending portion located radially outboard of the spoke hole in the spoke bed;
wherein, the stem portion extends through the central opening in the ferrule, the collar portion of the ferrule extends within the spoke hole, the spoke hole extends through the spoke bed and includes a radially inboard first end facing the central hub with a first edge and a radially outboard second end opposed to the first end with an associated second edge, the collar portion of the ferrule includes an outwardly extending portion that extends beyond the second end of the spoke hole, the outwardly extending portion of the ferrule includes an overlie engagement with the spoke hole to resist spoke tension forces, the enlarged portion of the spoke includes a transition portion between the enlarged portion and the stem portion.

48. A wheel according to claim 47, wherein said ferrule is deformably expanded to create an expanded portion, said transition portion is located in said separate element, and wherein said transition portion serves as a mandrel to create said expanded portion.

49. A wheel according to claim 48, wherein said separate element is a spoke nipple, and wherein said spoke nipple is displaced relative to said ferrule to create said expanded portion.

50. A wheel according to claim 47, wherein said separate element is rotatable with respect to said ferrule.

51. A wheel according to claim 47, wherein the separate element is a spoke nipple, and wherein said spoke nipple includes a threaded engagement with said spoke.

52. A wheel according to claim 47, wherein the separate element is a spoke nipple, and wherein the spoke nipple includes a threaded engagement with said ferrule.

53. A wheel according to claim 47, wherein the separate element, at least in part, includes non-circular geometry to facilitate manual rotation of the separate element with respect to the rim.

54. A wheel according to claim 53, wherein said non-circular geometry is exposed with respect to both the ferrule and the rim.

55. A wheel according to claim 47, wherein said separate element is retained within said cavity prior to connection between the spoke and connecting element.

56. A wheel according to claim 47, wherein at least one of said separate element and said spoke is rotatable with respect to said outer rim.

57. A method for assembling a wheel, which comprises:
providing a wheel which comprises a central hub, an outer rim, a plurality of spokes extending between said outer rim and said central hub, wherein at least one spoke includes an enlarged spoke portion which is one of (1) integral with said spoke, and (2) a separate element connected to said spoke, a connecting element for connection between at least one of said spokes and at least one of said outer rim and central hub, wherein at least one of said outer rim and central hub includes an external surface with an opening therein for attachment with at least one of said spokes, and wherein said opening includes a first external end adjacent said external surface and a second end opposed to said first end, and wherein the first end of said opening is exposed and the second end of said opening is obscured to restrict access; and
inserting the connecting element through the first end of said opening, and expanding said connecting element to provide connection between said spoke and at least one of said outer rim and said central hub through said opening so that the connection provides resistance to pull-out of at least one of said spokes from said opening due to spoke tension forces.

58. The method of claim 57, including the step of expanding the connecting element subsequent to said insertion of the connecting element.

59. The method of claim 57, including the step of expanding the connecting element during insertion of the connecting element.

60. The method of claim 57, including the step of creating an overlie engagement between the connecting element and the second end of the opening by said expanding step.

61. The method of claim 57, including providing the connecting element with a flange, and including the step of achieving the expanding of the connecting element by squeezing the connecting element between the enlarged spoke portion and the flange.

62. The method of claim 57, wherein the enlarged spoke portion cooperates with the connecting element to facilitate said expanding, and wherein the enlarged spoke portion is biased against the connecting element to expand the connecting element.

63. The method of claim 62, wherein the enlarged spoke portion is held fixed and the connecting element is displaced relative to the fixed enlarged spoke portion to achieve said expanding.

64. The method of claim 62, wherein the connecting element is held fixed and the enlarged spoke portion is displaced relative to the fixed connecting element to achieve said expanding.

65. The method of claim 62, wherein the enlarged spoke portion and the connecting element are simultaneously introduced through said opening.

66. The method of claim 62, including an assembly pin connected to said enlarged spoke portion, wherein said assembly pin is operable to bias said enlarged spoke portion against the connecting element to expand the connecting element.

67. The method of claim 66, wherein the assembly pin is removable, including the step of removing the assembly pin subsequent to the expanding of the connecting element.

68. The method of claim 66, including the step of threadably assembling the assembly pin to the enlarged spoke portion.

69. The method of claim 66, wherein the assembly pin includes a weakened region, including the step of breaking away the assembly pin at the weakened region.

70. The method of claim 57, including the step of expanding the connecting element with means connected to the spoke that serves as a mandrel element.

71. The method of claim 57, wherein the connecting element includes a flange, and including the step of providing that the first end of the opening serves as a depth stop for the flange during the expanding of the connecting element.

72. The method of claim 57, including the application of mechanical energy to heat the connecting element to facilitate said expanding.

73. The method of claim 57, including the step of piercing said opening by pressing at least one of the connecting element and said separate element connected to the spoke against at least one of said outer rim and central hub.

74. A method for assembling a wheel, the wheel comprising an outer rim, a central hub, a plurality of spokes extending between said outer rim and said central hub; and a connecting element forming a connection between at least one of said spokes and at least one of said outer rim and said central hub, wherein at least one of said outer rim and said central hub includes an external surface with an opening in said external surface for attachment with said spoke, and wherein said opening includes a first external end adjacent said external surface and a second end opposed to said first end,
the method comprising:
inserting said connecting element through the first end of said opening;
expanding said connecting element to provide said connection between said at least one of said outer rim and said central hub through said opening, the connection providing resistance to pull-out of said least one of said spokes from said opening due to spoke tension forces;
wherein said second end of said opening includes an edge and a surface adjacent said edge and wherein said expanding provides an overlying engagement between the connecting element and at least one of said edge and said surface adjacent said edge;
wherein said expanding is blind, with said connecting element operated upon external to said first external end of said opening;
wherein said expanding comprises biasing a mandrel element and said connecting element together; and
wherein a spoke nipple serves as said mandrel element.

75. A method for assembling a wheel, the wheel comprising an outer rim, a central hub, a plurality of spokes extending between said outer rim and said central hub, and a connecting element forming a connection between at least one of said spokes and at least one of said outer rim and said central hub, wherein at least one of said outer rim and said central hub includes an external surface with an opening in said external surface for attachment with said spoke, and wherein said opening includes a first external end adjacent said external surface and a second end opposed to said first end, the method comprising:

inserting said connecting element through the first end of said opening;

expanding said connecting element to provide said connection between said at least one of said outer rim and said central hub through said opening, the connection providing resistance to pull-out of said least one of said spokes from said opening due to spoke tension forces;

wherein said second end of said opening includes an edge and a surface adjacent said edge and wherein said expanding provides an overlying engagement between the connecting element and at least one of said edge and said surface adjacent said edge;

further comprising connecting a spoke nipple element to said at least one of said spokes and engaging said spoke nipple element to said connecting element; and further comprising threadingly engaging said spoke nipple element with said at least one of said spokes.

* * * * *